United States Patent [19]
Hobson, Jr.

[11] 3,869,649
[45] Mar. 4, 1975

[54] ELECTRICAL PROTECTIVE PANEL ASSEMBLY WITH SENSITIVE GROUND FAULT PROTECTING MEANS

[75] Inventor: Charles F. Hobson, Jr., Southington, Conn.

[73] Assignee: General Electric Company, Schenectady, N.Y.

[22] Filed: Apr. 13, 1973

[21] Appl. No.: 350,825

[52] U.S. Cl. .................. 317/18 D, 317/53, 317/26, 317/119
[51] Int. Cl. ......................... H02h 3/32, H02h 7/22
[58] Field of Search ........ 317/18 D, 18 B, 18 C, 53, 317/17, 26, 119; 336/174, 175; 324/51

[56] References Cited
UNITED STATES PATENTS

| | | | |
|---|---|---|---|
| 2,925,570 | 2/1960 | Strock | 336/175 |
| 2,980,824 | 4/1961 | Kobryner | 317/119 |
| 3,202,875 | 8/1965 | Bateman | 317/18 D |
| 3,275,889 | 9/1966 | Sharp et al. | 317/53 |
| 3,486,073 | 12/1969 | Eriksson et al. | 317/53 |
| 3,611,035 | 10/1971 | Douglas | 317/18 D |
| 3,745,415 | 7/1973 | Polley et al. | 317/18 D |

Primary Examiner—J. D. Miller
Assistant Examiner—Patrick R. Salce
Attorney, Agent, or Firm—R. A. Cahill; P. L. Schlamp; F. L. Newhauser

[57] ABSTRACT

An electrical protective circuit, including at least one and preferably a number of automatically operable circuit protective devices and means for connecting the circuit protective devices to corresponding power consuming loads. The protective circuit includes means for connecting the return or neutral conductors from the respective power consuming loads to one side of an electrical power source, which side is grounded at a point between the protective device and the power source. Means is included for detecting the presence of a ground fault on any one of the return or "neutral" conductors which occurs at a point between the corresponding protective device and the load which it protects.

The purpose of detecting the presence of such a neutral ground fault is primarily to render more accurate and reliable the operation of means for detecting and protecting against ground faults from the ungrounded or "high" side of the line to ground since such neutral grounding can render the detection of minute ground currents from the "high" side of the line to ground unreliable. This is particularly important in connection with ground fault detecting devices which are used for protecting people from injury or death by electric shock.

In one form of the invention a common terminal strip is provided for connecting together a plurality of return or neutral lines from a plurality of electrical loads. Means is also provided for inducing a voltage in the circuit in series relation with each and all of the return or neutral lines. On the occurrence of a fault between any return or neutral line and ground, current flows in the loop comprising the respective return or neutral conductor, the normal ground connection, ground, the ground fault, back to the return or neutral conductor. The presence of current in this path acts to cause the corresponding breaker to open.

An important feature of the invention is that it permits use of a single induced voltage to serve the needs of a number of circuits.

4 Claims, 8 Drawing Figures 3,869,649

ELECTRICAL PROTECTIVE PANEL ASSEMBLY WITH SENSITIVE GROUND FAULT PROTECTING MEANS

FIELD OF THE INVENTION

The present invention relates to electrical protective panel assemblies, and particularly to such panel assemblies which include sensitive (5 to 50 ma.) ground fault protecting means. More specifically, the invention relates to such panel assemblies which further include means guarding against loss of sensitivity or accuracy by an inadvertent and unintended grounding of "neutral" or return conductors connecting protective devices in the panel to corresponding electric loads.

BACKGROUND OF THE INVENTION

In the prior art, means has been provided for detecting relatively small ground fault currents between the "hot" or "high" side of a protected circuit and ground by means of comparing outgoing and return currents in the circuit. In such circuits, means has also been included for detecting the presence of unintentional grounding of the return or neutral line at any point between the sensing device and the load supplied by the circuit. This is done primarily because such a grounding can render the above described technique of detecting relatively small ground fault currents between the "high" side of the circuit and ground ineffective or inaccurate. In accordance with one prior art technique, a transformer has been provided which induces a voltage in the return or neutral line. Since the side of the power source to which the return line of the circuit is connected is ordinarily grounded at a point between the protective device and the source, the occurrence of a second ground connection on the return line at a point between the protective device and the load completes a circuit path or loop comprising a path through ground and through the return conductor, permitting current to flow in this loop due to the induced voltage. The flow of current in this loop is used to initiate opening of the circuit protective device. A patent disclosing the construction preferred is U.S. Pat. No. 3,506,906, Nestor, issued Apr. 14, 1970. A related technique for dealing with this problem is described in U.S. Pat. No. 3,473,091, Morris, et al., issued Oct. 14, 1969.

The present invention has significant advantages over the circuits of both the Nestor and Morris, et al., patents. Thus in accordance with the present invention, a single monitoring means may be used to guard against the grounding of the return or neutral conductors of a number of different load circuits. More specifically, a voltage-inducing means serves several circuits. In Nestor and Morris, et al., a separate means is required for each circuit to be protected.

OBJECTS OF THE INVENTION

It is an object of the present invention to provide an electrical protective circuit of the ground fault protection type in which means is provided for the detection of grounding of the return line of one or a plurality of circuit protective devices in a panel, without requiring a separate detection means for each circuit protective device.

It is another object of the invention to provide an electrical protective circuit of the type described which may readily be used with apparatus presently in commercial use, without major modification thereof.

It is another object of the invention to provide an electrical protective circuit of the type described which is relatively simple and easy to install.

It is a further object of the invention to provide an electrical protective circuit of the type described which may be readily checked as far as functioning is concerned.

Other objects of the invention will in part become obvious and in part be pointed out in the following detailed description, and the scope of the invention will be pointed out in the appended claims.

SUMMARY OF THE INVENTION

In accordance with the invention in one form, an electrical protective circuit is provided including means for connecting one or more circuit protective devices to a power source and for connecting such protective devices to corresponding power consuming loads. In addition, means is provided for connecting all of the return lines of such power consuming loads to a common point. For this purpose, a simple terminal strip or "neutral bar" which may be of prior art construction, is utilized. In addition, means is provided for inducing a voltage in the conductor which connects the terminal strip or neutral bar to the neutral or grounded side of the power source. Accordingly, when a ground fault occurs on the return line of any of the aforesaid plurality of power consuming loads, a complete circuit path or loop is formed through which current flows due to the induced voltage. The flow of such current is utilized to initiate opening of the circuit breaker connected to the particular power consuming load having the ground fault.

DESCRIPTION OF A PREFERRED EMBODIMENT

Figure 1:
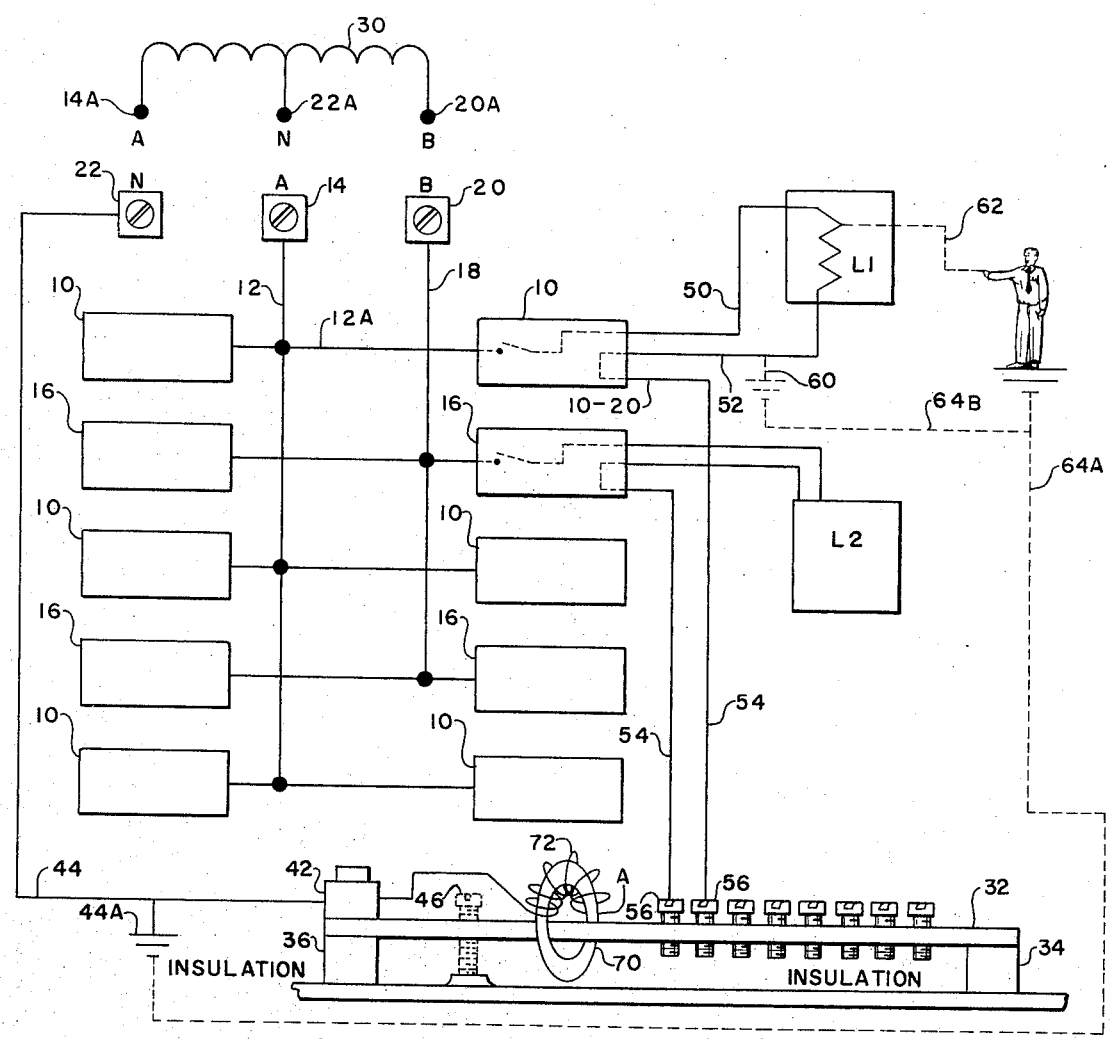
FIG. 1 is a semi-schematic drawing of a circuit protective device assembly including a plurality of circuit protective devices and the electrical protective circuit of the present invention.

Referring to FIG. 1, the invention is shown in one form as embodied in electrical apparatus including a plurality of automatically operable electric circuit breakers 10 which are connected to a power supply bus bar 12 which in turn is connected to an incoming power terminal 14. Also included are a plurality of circuit breakers 16 which are connected to a power supply bus bar 18 which is connected to a power source terminal 20.

The panel or assembly arrangement shown is of the type suitable for use with a center-tapped secondary as a power source providing for example 120/240 volt incoming power source, there being approxmately 120 volts between either of the bus bars 12, 18 and the neutral conductor 44, and 240 volts between the conductors 12 and 18. The particular form and arrangement of the circuit breakers 10 and 16 and their connection to power bus bars and power source terminals is chosen as merely illustrative of one form commonly in use. It will be appreciated, however, that a great many different forms and arrangements for connecting circuit breakers to power source terminals are in use and may utilize the invention, as well as many modifications thereof which will readily occur to those skilled in the art. A third power source terminal 22 is also provided for connection to a "neutral" power source terminal. A typical installation for such an arrangement of circuit breakers and power source terminals, for illustrative purposes, would be for the terminals 14 and 20 to be connected to corresponding terminals 14A and 20A of a power transformer secondary 30, and for the neutral terminal 22 to be connected to a neutral terminal 22A of such a power transformer secondary.

The electrical apparatus assembly illustrated embodying the invention also includes a neutral bar or terminal strip 32 which is supported on insulating supports 34, 36 on the back wall 38 of a suitable enclosure. The neutral bar 32 carries a plurality of connecting terminals 56 for making connection with return conductors 54 of the power circuits supplied or controlled by the circuit breakers 10 and 16. The neutral bar 32 also carries a main neutral connecting terminal member 42 for connection with a conductor 44 connected to the main neutral terminal 22. If desired, a connecting or "bonding" screw may be utilized, connecting the neutral bar 32 to the enclosure 38.

As illustrated, each of the electric circuit breakers 10 controls the supply of power to a predetermined corresponding power consuming load such as L1, L2, etc.

Tha apparatus described to this point is conventional, and the portions of the apparatus with the exception of the power transformer secondary 30 and the power consuming loads L1, L2, etc. and their connecting lines, form what is conventionally referred to in the trade as a "load center" or "panelboard," and is ordinarily mounted in a generally rectangular metallic enclosure usually located at or near the point of entrance of electric power lines to a building or a portion of a building. It will be appreciated, however, that the circuit which is the subject of the present invention is not limited to the physical arrangement and/or mounting of the circuit protective devices or the power connecting terminals used to lead power to them or from the circuit protective devices to the power consuming loads, or to the particular form and arrangement of the common neutral conductor or neutral bar.

Figure 2:
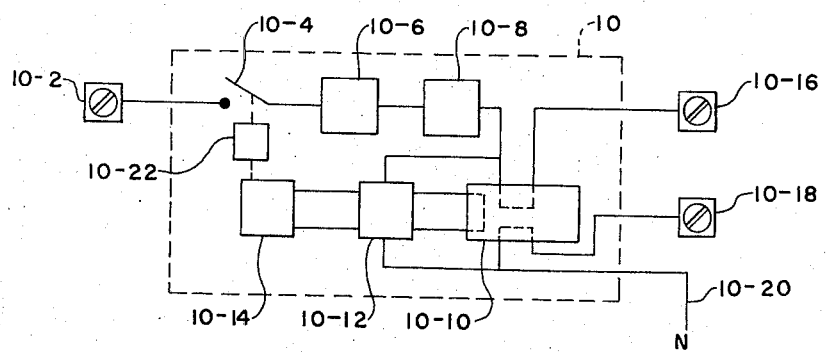
FIG. 2 is a schematic drawing showing the construction of a particular type of circuit protective device which is suitable for use with the invention in one form.

For purposes of illustration, a particular form of electric circuit protective device or circuit breaker has been shown at 10 and 16, and is schematically illustrated at FIG. 2. These protective devices include means, to be described, for detecting minute ground fault currents such as might cause injury to a person touching the high side of the line and a grounded object at the same time. The circuit protective device or circuit breaker 10 includes: (1) separable means for interrupting the circuit, (2) manually and/or automatically operable means for operating the contacts, (3) inverse time-current responsive means for causing automatic opening of the contacts upon the occurrence of overcurrent conditions including sustained, relatively minor, overcurrent conditions hereinafter referred to as "inverse-time" overcurrent responsive means, and (4) "direct acting" overcurrent responsive means responsive to overcurrents higher than those responded to by said inverse-time overcurrent responsive means. The inverse time overcurrent responsive means may comprise a bimetallic strip, while the "direct acting" overcurrent responsive means may comprise electromagnetic means. These current-responsive means are indicated by labelled rectangles in FIG. 2. The circuit breaker 10 also includes means for detecting the occurrence of a minute ground fault in the circuit protected by the circuit breaker. This last-mentioned means in one form comprises current unbalance detecting means operated by detecting an unbalance of current in the outgoing and return conductors of the circuit and developing a signal corresponding to such unbalance, which signal causes automatic opening of the circuit breaker.

In the circuit breaker illustrated, these elements are illustrated as follows. As shown in FIG. 2, the circuit breaker 10 includes an incoming power terminal 10-2, and separable contact means 10-4. The inverse-time acting overcurrent responsive means is indicated as 10-6. The direct-acting overcurrent-responsive means is indicated at 10-8. Current unbalance signal generating means is indicated at 10-10. The breaker 10 also includes electronic switch means 10-12, and electrically operable tripping means 10-14 to be described. Also included are outgoing or load terminal connecting means 10-16 and return load connecting terminal means 10-18 and main circuit return terminal connecting means or neutral conductor connector 10-20 which is furnished with the breaker and is long enough to reach the neutral terminal strip 32. The manually and automatically operable operating mechanism for the contacts 10-4 may be conventional, and is illustrated diagrammatically at 10-22. A complete disclosure and description of an electric circuit breaker of the type described and suitable for use with the present invention is contained in application Ser. no. 171,770 by Hobson and Dimond and assigned to the same assignee as the present invention.

The current path through the circuit breaker 10 of FIG. 2 is as follows: from incoming power terminal 10-2 to separable contact 10-4, to inverse-time overcurrent responsive means 10-6, to direct-acting overcurrent responsive means 10-8, through current unbalance signal generating means 10-10, to outgoing load connecting conductor 50 is illustrated extending from the circuit breaker 10 to the load L-1, and a return or neutral conductor 52 is illustrated extending from the load L-1 to the circuit breaker terminal 10-18.

From the load return connecting terminal 10-18, the circuit continues through the current unbalance signal generating means 10-10 to the terminal 10-20 for connection to the return side of the power source.

In summary, each circuit breaker 10 includes two power source connecting terminals 10-2 and 10-20 and two load connecting terminals 10-16 and 10-18.

While the invention in the form illustrated is shown as used with a circuit breaker 10 of the type which brings the load return conductor 52 back through the circuit breaker 10, it will be appreciated that the invention may be used with circuit breakers which do not bring the load return conductor back through the circuit breaker.

The power source terminal 10-20 of the circuit breaker 10 is connected by means of conductor 54 to a common connecting terminal strip or "neutral bar" 32 by means of a particular connecting screw 56.

The overall circuit path, including the circuit breaker 10 of a typical circuit may be traced as follows: from the incoming power terminal 14, to the power bus bar 12, to the cross-connecting strap 12A, to the circuit breaker terminal 10-2, through the circuit breaker 10 in the manner previously described, to the outgoing load conductor 50, through the load L-1, to the return load conductor 52, to the conductor 10-20 of the circuit breaker 10, to the conductor 54, to the neutral bar 32, to the main neutral connector 42, to the main neutral terminal 22. The main neutral conductor is connected to ground in any suitable manner, such as by the connection 44A. It will be appreciated, however, that such ground connection may be made at some point on the source side of the terminal 22, especially if the panel assembly is fed from another panel assembly.

As illustrated in FIG. 1, it is possible that because of damage to the conductors or other reasons, the conductor 52 may become accidentally connected to ground at a point remote from the circuit breaker 10, such as the point 60, adjacent the load L-1. If this occurs, there will be no significant adverse effect upon the operation of the load L-1, since the circuit path through it remains intact. Nevertheless, the existence of the ground 60 makes it more difficult to detect the occurrence of an unintentional ground between the high side of the load L-1 and ground as indicated schematically at 62. The detection of a ground condition such as indicated at 62 is extremely important, however, since it is necessary in order to protect against electric shock to persons who may come in contact with a grounded object. In such a situation, it will be obvious that current passing through the ground fault 62 (which may include a person's body), can return to the grounded side of the power source by a path 64A which goes through ground to the grounded point 44A of the conductor 44, and then to the terminal 22.

In addition, however, at least a portion of the ground fault current through the ground fault 62 may, as indicated, return to the grounded side of the power source by another path. Thus this portion of such current may travel a short distance through a ground path 64B, and then enter the conductor 52 through the fault 60, then through 52, through the circuit breaker 10 to the conductor 54, to the neutral bar 32, to the conductor 44, etc. Thus a substantial portion of the current passing through the ground fault 62 (which may include a person) may enter the conductor 52, and pass through the circuit breaker 10, thereby making it more difficult to detect the occurrence of a ground such as 62 by comparing the amounts of current in the outgoing and return conductors 50 and 52.

In accordance with the invention, a voltage signal is imposed in the return path including the neutral strip 32. In the form of FIG. 1, a transformer core of generally toroidal shape 70 is provided, encircling the neutral conductor strip 32. The core 70 carries a primary winding 72 which has a suitable voltage impressed thereon, such, for example, as the voltage available between the terminals A (terminal 14) and the terminal N (terminal 22). Thus the conductor strip 32 acts as a single turn secondary in which a voltage is induced by the primary.

The voltage which is applied to winding 72 may be either an alternating voltage or a pulsating DC voltage. For convenience, the unmodified line voltage appearing between terminals 14 and terminal 22 has been indicated. As stated, the neutral conductor or terminal strap 32 acts as a single turn secondary winding through the core 70, and therefore has induced in it a voltage by the primary winding.

Figure 3:
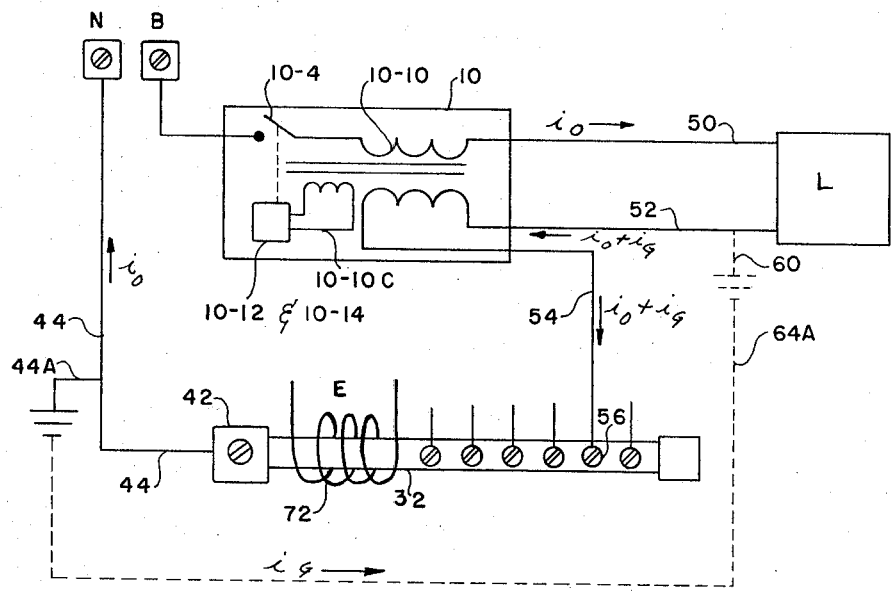
FIG. 3 is a schematic drawing showing the current paths existing and the flow of current during operation of the invention in the form of FIG. 1.

Accordingly, upon the occurrence of a ground connection between the neutral or return conductor 52 and ground, (or the corresponding return conductor of any other circuit) as indicated at 60 in FIGS. 1 and 3, a conductive loop is completed as indicated in the simplified drawings of FIG. 3. This current loop is as follows: from the terminal strap 32, through a portion of the neutral connector conductor 44, to the normal ground connection 44A, through the ground circuit path 64A, to the ground fault 60, through the conductor 52, through a portion of the circuit breaker 10, such as including one winding of the differential transformer 10-10, to the conductor 54, to the neutral bar 32. Since this current flows through only one of the windings of the differential transformer 10-10, it creates an unbalance in the differential transformer 10-10, causing a signal to be developed by the secondary winding 10-10C. This signal is fed to the electronic switch 10-12 and electrically operable operating tripping means 10-14 in circuit breaker 10, causing automatic opening of the circuit breaker mechanism 10-22 and opening of the contacts 10-4.

It is an important feature of the present invention that since the voltage induced by the winding 72 of the transformer 70 appears in series with all of the return conductors 54, 54A, etc. from all of the circuit breakers 10 and 16 which are connected to the terminal straps 32, this voltage is available to operate to cause tripping of any of the circuit breakers on which such a ground occurs between their return conductor and ground. In other words, the induced voltage is induced at a point between the point where all of the return lines from the circuit breakers 10 and 16 are connected to a common conductor and the point where this common conductor is connected to ground, i.e., at the normal grounding point 44A. If desired, a "bonding" screw 46 may be connected between the terminal strap 32 and the enclosure wall 38 of the load center illustrated. If such bonding screw is used, it is preferably positioned between the transformer 70 and the point of connection of the terminal strip 32 to ground, as at 44A. Accordingly, therefore, if the bonding screw 46 should provide a ground connection for the terminal strap 32, such as by reason of the enclosure 38 being connected to ground, this will not adversely affect operation of the system.

The invention permits substantial simplification of the construction of each ground fault interrupting circuit breaker 10, since it is no longer necessary as taught by the prior art, to include a voltage inducing means within each of the circuit breakers.

Figure 4:
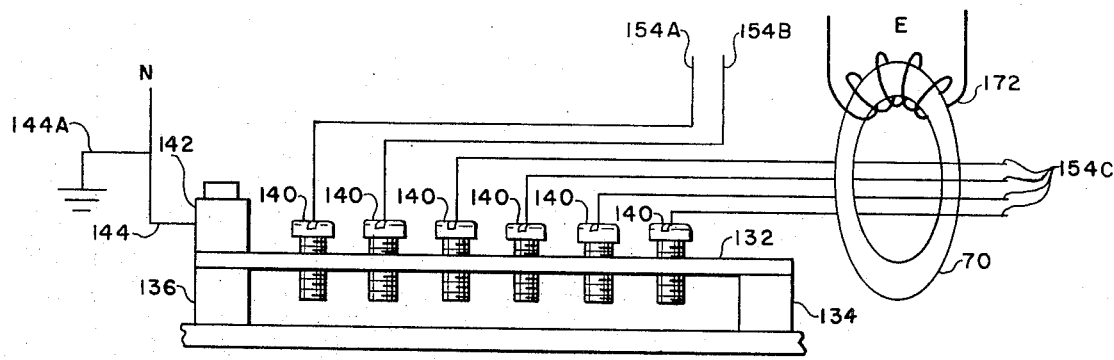
FIG. 4 is a semi-schematic drawing of a portion of an electrical protective circuit in accordance with another form of the invention.

In FIG. 4, there is illustrated a modified form of the invention including a neutral terminal strap 132 supported by insulating supports 134 and 136 and connected by a main neutral terminal 142 to a neutral conductor 144 which is connected to ground at a main ground point 144A. All of the circuit breakers which are desired to be protected against accidental grounding of the conductors 50 or 52 are connected to the terminal strip 132 by suitable means, such as by terminal screws 140. In this form, the transformer 70 encircles all of the conductors 154 which constitute return or neutral lines from such circuit breakers, and only such conductors.

Operation of the invention in accordance with the form of FIG. 4 is substantially identical to that described in connection with the form illustrated in FIGS. 1–3, and therefore will not be described further.

Figure 5:
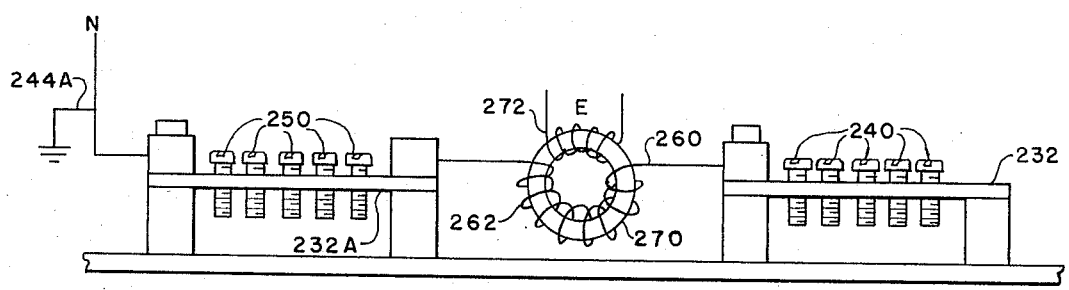
FIG. 5 is a semi-schematic drawing of a portion of an electrical protective circuit in accordance with a third form of the invention.

In the form of the invention illustrated in FIG. 5, two "neutral" strips 232 and 232A are provided which are connected electrically in series by a conductor 260. The conductor 260 is connected electrically in series with a secondary winding 262 which is wound on the transformer core 270. A primary winding 272 is provided, wound on the core 270 in a manner similar to that described in connection with the previous figures. In this form, two independently usable optional variations are disclosed. The first is the use of a multi-turn secondary 262 on the transformer core 270, thereby increasing the coupling between the primary winding 272 and the secondary 262, which is effective to produce a voltage serving the function described above. Electric circuit breakers which include means for causing automatic opening of the circuit and/or visual indication of the grounded condition of one of the conductors have their return conductors, not illustrated, connected to the terminal strip 232 such as by means of the terminal screws 240. Circuits which do not include ground fault tripping means may then be connected to the terminals 250 of the terminal or neutral strip 232A.

Figure 6:
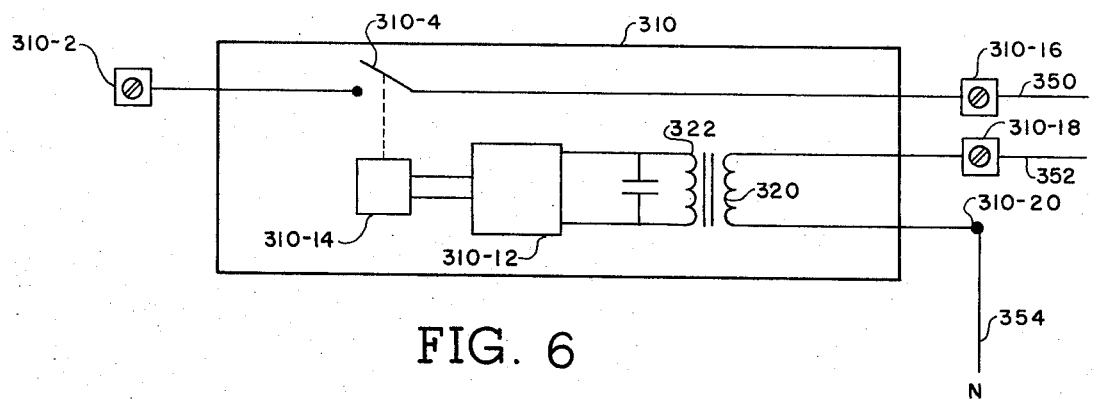
FIG. 6 is a schematic drawing of a portion of the circuit of the invention in another form.

So far as circuit breakers connected to the terminal or neutral strip 232 are concerned, operation of the invention is similar to that described in connection with FIGS. 1–4. In other words, the voltage induced in the secondary winding 262 appears in series with the return conductors of circuit protective devices connected to the terminal or neutral strip 232. Accordingly, on the occurrence of a ground fault condition on the return conductors of one of the circuits which have their return conductors connected to the terminal strip 232 causes a current loop to be completed between such ground point and the main ground point 244A of the system, causing a circulating current to pass through a ground circuit path, not illustrated, to the ground fault through the return conductor of the respective circuit protective device. In FIG. 6, a winding 320 may be provided in series with the return line 352 of a given circuit breaker. The winding 320 may be coupled by suitable means to a tuned circuit indicated generally at 322 and connected to an electronic switch 310-12 which in turn is connected to an electrically operable tripping device 310-14 to trip the contacts 310-4. Upon the occurrence of an unintentional ground of the type indicated, a current of frequency determined by an oscillator, not shown, located in the position of the transformer 70 in the form of FIGS. 1 through 4, will appear across the winding 320, and will induce a corresponding voltage in the tuned circuit 322, causing a signal which turns on the electronic switch 310-12, causing actuation of the electrically operable tripping device 310-14.

Figure 7:
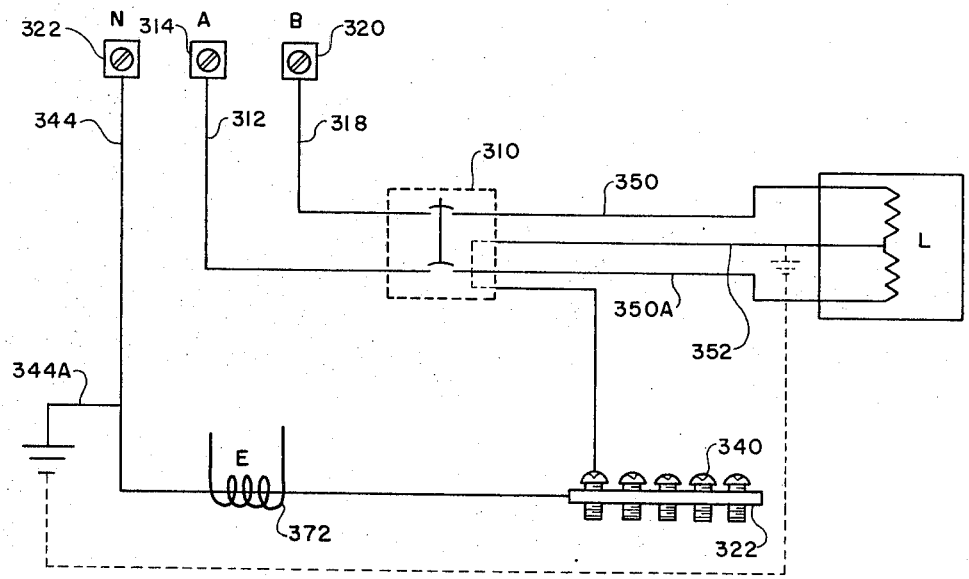
FIG. 7 is a schematic drawing of the invention as applied to a typical U.S. 120/240 volt circuit.

In the form of FIG. 7, the invention is shown as utilized in a 240 volt circuit, that is, one which is connected across terminals 314 and 320. In this form, the circuit breaker 310 includes a differential transformer through which all three conductors 350, 352 and 350A pass. Since these currents should normally add to zero, the flowing of a minute current, such as caused by an induced voltage created by winding 372, causes an imbalance, and tripping of the circuit breaker.

Figure 8:
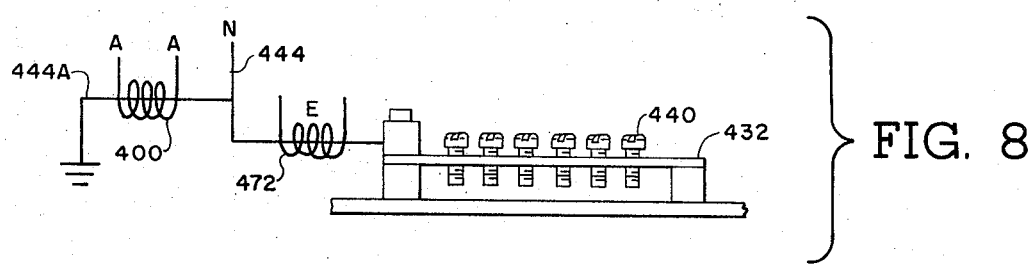
FIG. 8 is a fragmentary schematic drawing of the invention in another form.

In FIG. 8 still another form of the invention is illustrated. In this form, a winding 472 is placed around the conductor 444 (although it may be placed around the strap 432 as in FIG. 1 or around all selected return lines as in FIG. 4), and induces a voltage in the encircled conductor as previously described. Upon the occurrence of a ground on any load return conductor, a complete loop is formed, and current flows as previously described. A sensing winding 400 is placed around the conductor 444A which connects the conductor to ground. The flow of current in the loop illustrated in FIG. 3 is detected by this winding, causing a voltage to appear between the terminals A-A of the winding 400. This voltage is then fed to the electronic switch 10-12 of the breakers 10.

Since, in the form of FIG. 8, the current sensing means is also external of all the breakers 10, 16, the voltage at A-A must be connected to all breakers desired to be protected against grounding of the return conductor. This form is therefore most useful in installations where only one, two, or three of the breakers 11, 16 are equipped with sensitive ground fault sensing means, since all such breakers would be tripped simultaneously. Nevertheless, it is to be expected that in small load centers this will be the case. In such cases, some technique other than the use of a sensitive differential transformer may be used for the detection of minute ground fault currents if desired.

It will be observed that n accordance with the invention, a simple and relatively inexpensive means has been provided for achieving protection against grounding of the return conductor of ground fault protective circuit breaker circuits. It will further be observed that only one such voltage inducing means is required for protection of an entire panel of circuit breakers. The voltage required to be induced in such return lines is very small, being only great enough to produce a current of 5 milliamperes or slightly more.

While the invention has been illustrated in connection with a particular type of ground fault protecting circuit breaker as illustrated in FIG. 10 using a differential type transformer, it will be readily apparent to those skilled in the art that ground fault circuit breakers of different types may be used. For example, such circuit breakers having means other than a "differential transformer" may be used with the invention.

While several forms of the invention have been specifically shown and described, it will be readily apparent to those skilled in the art that many modifications thereof may readily be made. It is therefore intended by the appended claims to cover all such modifications as followed in the true spirit and scope of the invention.

I claim:

1. An electrical protective circuit for supplying power to an electrical load and including means responsive to the occurrence of unintended ground connection between at least one load supplying conductor and ground comprising:
  a. a support;
  b. an electrical circuit protective device supported on said support and having a first terminal for connection to one side of an electrical power source and a second terminal for connection to an outgoing conductor for supplying power to a remote power consuming load, said device including means for interrupting current to such outgoing conductor;
  c. return conductor electrical connecting means supported on said support for connection to a return conductor from such power consuming load;
  d. terminal connecting means supported on said support for connection to the side of such power source opposite from such one side, and conductor means connecting said terminal connecting means to said return conductor connecting means;
  e. voltage inducing means for inducing a voltage in said conductor means;
  f. ground connecting means connecting said conductor means to ground at a point closer to said terminal connecting means than the point at which said voltage inducing means induces a voltage in said conductor means;
  g. current detecting means associated with said ground connecting means for detecting current therein, and for developing a signal in response thereto;
  h. means connected between said current detecting and said circuit interrupting device for causing automatic opening of said circuit interrupting device upon the generation of a predetermined signal by said current detecting means.

2. An electrical protective circuit as set forth in claim 1 wherein said protective circuit includes more than one circuit interrupting device and wherein said return conductor connecting means includes means for connection to the return conductors of a plurality of said interrupting devices and wherein said circuit also includes means for causing automatic opening of all of said devices having their return conductors connected to said return conductor connector means.

3. An electrical protective panel assemblly comprising:
  a. an enclosure;
  b. a plurality of automatic circuit protective devices in said enclosure;
  c. a neutral bar in said enclosure for receiving return power conductors from a plurality of electrical power consuming loads;
  d. a first primary electrical connector in said enclosure for connection to input terminals of such electrical devices;
  e. a second primary electrical connector in said enclosure;
  f. conductor means connecting said neutral bar to said second primary electrical connector;
  g. voltage inducing means in said enclosure for inducing a voltage in said conductor means between said neutral bar and said second primary electrical connector;
  h. grounding conductor means connecting said conductor means to ground on the line side of said voltage inducing means;
  i. current sensing means associated with said grounding conductor means, said current sensing means generating an electrical signal upon the flow of current through said grounding conductor means;
  j. whereby said electrical signal generating means may be utilized to cause automatic opening of at least one or more of such protective devices providing power to power consuming loads having their return conductors connected to said neutral bar.

4. An electrical protective panel assembly comprising, in combination:
  a. at least two electrical power source terminals for connection to an external source of electrical power;
  b. means connecting a plurality of first electrical circuit protective devices to one of said electric power source terminals, each of said first devices having ground fault circuit interrupting capability in form of means for sensing an imbalance in the currents flowing to and returning from remotely connected loads;
  c. means connecting a second plurality of electrical circuit protective devices to said one electric power source terminal, said second devices lacking ground fault circuit interrupting capability;
  d. means connecting the other of said electric power source terminals to ground;
  e. first and second connector bars, said second connector bar being electrically connected to said grounded power source terminal;
  f. an outgoing conductor connecting each said first protective device to a different electrical load and each said second protective device to a different second electrical load;
  g. a return conductor connecting each said first electrical load to the associated one of said first protective devices and each said second electrical load to said second terminal bar;
  h. conductor means connecting said first terminal bar to each of said first protective devices and in series with said return conductors connected from said first electrical loads; and
  i. electrical signal injecting means including a transformer core and a multi-turn secondary winding connected in series between first and second terminal bars, said signal injecting means operative to create an electrical signal voltage common to said return conductors connected from said first loads;
  j. whereby inadvertent grounding of any one of said return conductors connected to said first loads produces a complete circuit loop not including said power supply in which said signal voltage causes a signal current to circulate, thereby to produce a current imbalance sensible by the one of said first devices connected to said grounded return conductor.

* * * * *